Stevenson & Pearce.
Piston Packing.

No. 96,993.          Patented Nov. 16, 1869.

Witnesses.

W. M. Stevenson and A. Pearce
by their attorney

United States Patent Office.

WILLIAM M. STEVENSON AND AUSTIN PEARCE, OF HARMONY, PENNSYLVANIA, ASSIGNORS TO THEMSELVES AND GEORGE E. HANDY, OF BOSTON, MASSACHUSETTS.

Letters Patent No. 96,993, dated November 16, 1869.

IMPROVED PACKING FOR PISTONS AND VALVES.

The Schedule referred to in these Letters Patent and making part of the same.

*To all persons to whom these presents may come:*

Be it known that we, WILLIAM M. STEVENSON, of Newcastle, of the county of Lawrence, and AUSTIN PEARCE, of Harmony, of the county of Butler, and State of Pennsylvania, have invented a new and useful Improvement in Engine-Pistons and Valves; and we do hereby declare the same to be fully described in the following specification, and represented in the accompanying drawings, in which—

Figure 1:
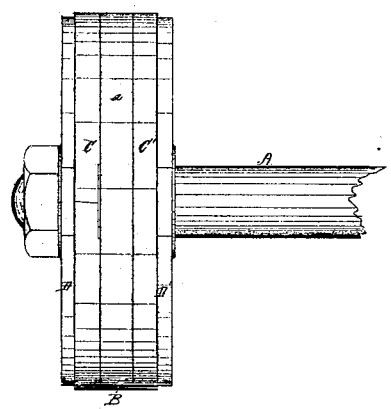
Figure 2:
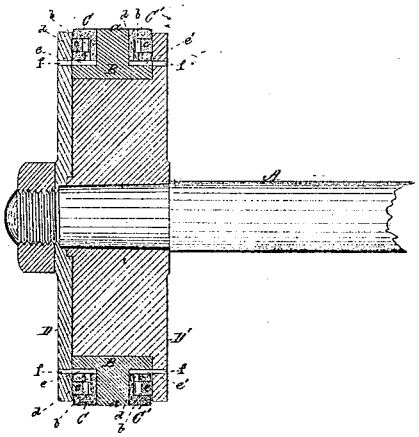

Figure 1 is a side elevation,

Figure 2, a transverse section of a steam-engine piston as provided with our invention.

Figure 3:
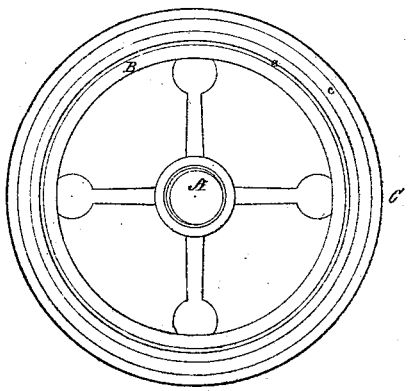

Figure 3 is a representation of the interior of the piston, with its cap-plate as removed from it.

The improvement has reference to such pistons as have metallic ring packings; and It consists mainly in each of the packing-rings being constructed with an annular groove, and provided with an auxiliary packing-ring arranged within such groove, and provided with passages, by which the steam, when the piston may be in operation, will be led into the annular groove, so as to force the large ring against its seat, and the smaller against the cap-plate next to it.

In the drawings—

A denotes a piston-rod, having a cylindrical head, B, from the middle of whose periphery an annular rib or flange, *a*, extends. This rib or flange continues entirely around the head. Its opposite plane faces constitute bearings or seats for two rings, C C', which loosely encompass the piston-head, and are arranged thereon in manner as represented in the drawings.

Each of these rings is kept in place by one of two disks or cap-plates, D D', which lie against the opposite ends of the head B, and have diameters corresponding to that of the flange *a* disposed midway between them.

Each of these rings, on the side thereof which is next to the next adjacent cap-plate, is channelled or grooved entirely around it, as shown at *b*, and there is arranged in such groove an auxlliary ring, *c*, of metal or other suitable material.

Furthermore, from the inner circumference of each main ring, C or C', one or more holes, *d*, are bored into the auxiliary ring-groove.

One or more holes, *f*, are also bored through the next adjacent cap-plate D or D', so as to open communication with the narrow space *e* or *e'* between the ring and the head B.

When the piston is in operation in a steam-engine cylinder, the steam will pass through the holes *f* into space *e* or *e'*, thence through the holes *d* into the groove of the main ring, and will force the auxiliary ring against the next cap-plate, and the main ring up to the seat thereof of the flange, thereby securing close joints at the sides of the main ring.

Both the main and auxiliary rings are to be split or cut through, so as to enable them to be expanded by the steam, in order that the outer circumference of the main ring may be forced out into close contact with the bore of the cylinder.

By our improvement we are enabled to insure close joints at the sides as well as at the periphery of each of the main expansive rings.

Furthermore, by our invention there will be friction brought on each main ring, to prevent it from being too quickly expanded against the cylinder, the same serving to prevent much wear of the ring and cylinder, which otherwise would be liable to take place.

Our invention is equally applicable to various pistons which have their expansive metallic packings in other shapes than that of a ring. It is also applicable, in some instances, to slide-valves.

Such are different modes in which we have contemplated the application of that principle or character, by which our invention may be distinguished from others.

We therefore claim the arrangement of the auxiliary ring *c* and its chamber or groove *b*, with each or either of the main rings C C', and with passages *d f*, for leading the steam to the inner periphery of the main ring, and thence into the groove *b* of such main ring, the whole being substantially as and to operate as hereinbefore explained.

WM. M. STEVENSON.
AUSTIN PEARCE.

Witnesses:
R. H. EDDY,
S. N. PIPER.